(12) United States Patent
Dunn et al.

(10) Patent No.: US 8,729,900 B1
(45) Date of Patent: May 20, 2014

(54) LOCATABLE FIBER OPTIC CABLE

(75) Inventors: Lawrence R. Dunn, Flowery Branch, GA (US); John D. Armistead, Marietta, GA (US); Ronald H. Petersen, Cumming, GA (US); Terry A. Richards, Marietta, GA (US); Christopher W. McNutt, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 1084 days.

(21) Appl. No.: 12/660,808

(22) Filed: Mar. 3, 2010

Related U.S. Application Data

(60) Provisional application No. 61/209,150, filed on Mar. 3, 2009.

(51) Int. Cl.
*G01V 3/08* (2006.01)

(52) U.S. Cl.
USPC .......................................................... 324/326

(58) Field of Classification Search
USPC .......................................................... 324/326
See application file for complete search history.

(56) References Cited

U.S. PATENT DOCUMENTS

| | | | |
|---|---|---|---|
| 3,249,773 A * | 5/1966 | Barthold | 307/147 |
| 3,766,645 A | 10/1973 | Ziemek | |
| 4,487,641 A | 12/1984 | Bohannon et al. | |
| 4,557,560 A | 12/1985 | Bohannon, Jr. et al. | |
| 4,577,925 A * | 3/1986 | Winter et al. | 385/106 |
| 4,826,278 A | 5/1989 | Gartside et al. | |
| 4,878,733 A | 11/1989 | Winter et al. | |
| 4,971,419 A | 11/1990 | Gartside et al. | |
| 5,082,348 A | 1/1992 | Gartside et al. | |
| 5,095,176 A | 3/1992 | Harbrecht et al. | |
| 5,438,265 A | 8/1995 | Eslambolchi et al. | |
| 5,644,237 A * | 7/1997 | Eslambolchi et al. | 324/326 |
| 5,948,202 A * | 9/1999 | Miller | 156/714 |
| 6,047,586 A * | 4/2000 | Hannen | 72/262 |
| 6,317,540 B1* | 11/2001 | Foulger et al. | 385/100 |
| 7,532,794 B2* | 5/2009 | Cook | 385/101 |
| 2003/0049002 A1* | 3/2003 | Bosisio et al. | 385/109 |
| 2004/0016566 A1* | 1/2004 | Sylvia et al. | 174/117 M |
| 2005/0180704 A1* | 8/2005 | Terry et al. | 385/100 |
| 2007/0081773 A1* | 4/2007 | Pizzorno et al. | 385/100 |
| 2007/0272430 A1 | 11/2007 | Tuffile | |
| 2008/0191682 A1* | 8/2008 | Cook | 324/67 |
| 2008/0227887 A1* | 9/2008 | Klier et al. | 523/173 |
| 2009/0274426 A1* | 11/2009 | Lail | 385/105 |

OTHER PUBLICATIONS

Lucent Technologies, "Fiber Optic Outside Plant Cable Specification", Issue 4, Aug. 2000.

* cited by examiner

*Primary Examiner* — Jermele M Hollington
*Assistant Examiner* — Temilade S Rhodes-Vivour

(57) ABSTRACT

A communication cable, such as a fiber optic cable, can comprise a conductive tape that extends along the cable and that facilitates locating the cable from a remote location, for example when the cable is buried under ground. The tape can comprise a low resistance for transmitting a locate signal along the length of the cable that can be detected remotely by a detector without exposing the cable. The conductive tape can be circumferentially applied around the core of the cable under the cable's jacket. Thus, the conductive tape can be accessed without exposing the core. The cable can include one or more buffer tubes for housing optical fibers. The buffer tubes and/or the jacket can comprise an antioxidant for preventing degradation associated with contact with copper or other metal of the conductive tape.

21 Claims, 4 Drawing Sheets

LOCATABLE FIBER OPTIC CABLE

CROSS REFERENCE TO RELATED APPLICATIONS

This patent application claims priority under 35 U.S.C. §119 to U.S. Provisional Patent Application No. 61/209,150, entitled "Locatable Fiber Optic Cable" and filed Mar. 3, 2009, the entire contents of which are hereby incorporated herein by reference.

TECHNICAL FIELD

The present invention relates generally to fiber optic communication cables and more specifically to incorporating a conductive tape within a communication cable for transmitting a detectable signal along the cable length so that the cable can be located from a remote location, for example when the cable is buried underground.

BACKGROUND

Installation of communication cables, such as fiber optic cables, routinely involves burying the cable underground. For example, communication companies bury cables underground for protection, safety, and to meet local codes. Locating such buried cables years after installation is often problematic. Without knowing the precise location of the buried cable, servicemen may inadvertently sever the cable when installing or servicing an adjacent communication cable, utility line, sewer, waterline, gas pipe, or electrical cable. To minimize the aforementioned drawbacks, utility companies typically rely on electromagnetic signaling to locate buried cables.

Currently, buried fiber optic cables are located using electromagnetic signals generated from wires in ducts radiating an electromagnetic signal or by incorporating an electrically conductive wire in the cable construction for carrying a detectable electromagnetic signal. A conventional method for incorporating a conductor into a stranded tube fiber optic cable is to place the conductor in a position usually reserved for one of the tubes. However, this method has several drawbacks. One drawback is that the conductor becomes an integral component of the core, making access to the conductor difficult, often requiring a technician to expose the entire cable core. Another drawback is that the overall optical fiber density of the cable design is reduced.

Yet another drawback to incorporating a wire conductor into a stranded tube fiber optic cable is that the conductor may create an imbalance of contractive forces in the cable, attenuating or distorting the optical fibers' signals at low temperatures. Addressing such forces with conventional technologies involves incorporating cumbersome changes to a standard cable design to negate the unbalanced, contractive forces. Such changes may detrimentally increase cable diameter, for example causing issues with innerduct installation.

Accordingly, to address these representative deficiencies in the art, an improved capability is needed for detecting a buried fiber optic cable. Another need exists for an apparatus that can be disposed in a fiber optic cable to facilitate locating the cable while maintaining signal balance in the cable and desirable diameter profile. Yet another need exists for an apparatus that can be disposed in a fiber optic cable to facilitate locating the cable and that can be accessed easily without exposing the cable core or while keeping the cable core intact.

A capability addressing one or more of the aforementioned needs, or some related need in the art, would support increased usage of buried fiber optic cables and would reduce service disruption associated with inadvertently severed cables.

SUMMARY

The present invention supports cables, such as fiber optic cables, comprising a conductive tape disposed therein for transmitting a locate signal that can be detected from remote locations, such as when the cable is buried underground.

In one aspect of the present invention, a fiber optic cable can comprise a buffer tube comprising one or more optical fibers. The fiber optic cable can comprise a conductive tape wrapped at least partially around the buffer tube and extending along a length of the fiber optic cable. The conductive tape can have a resistance less than about ten ohms per mile. The conductive tape can transmit an electrical signal along the length of the fiber optic cable. The fiber optic cable can comprise a jacket circumferentially covering the conductive tape.

In another aspect of the present invention, a method for locating a fiber optic cable buried under ground can comprise coupling an electrical locate signal onto a conductive tape disposed in the fiber optic cable. The conductive tape can have a resistance less than about ten ohms per mile and carry the locate signal along the length of the fiber optic cable. A signal detector can detect energy radiating from the conductive tape above the ground.

In yet another exemplary embodiment, a fiber optic cable can comprise a jacket extending lengthwise and defining an internal volume. Buffer tubes can be stranded and extend lengthwise in the internal volume. Each buffer tube can circumferentially surround a respective stack of optical fibers. The fiber optic cable can comprise an electrically conductive tape that extends lengthwise within the internal volume. The electrically conductive tape can have a resistance not greater than about ten ohms per mile. At least one of the buffer tubes can comprise a polymer and an antioxidant that is operative to avert degradation of the polymer due to contact with the electrically conductive tape.

The discussion of locatable fiber optic cable and conductive tape for transmitting a detectable locate signal presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, processes, and objects of the present invention will become apparent to one with skill in the art upon examination of the following drawings and detailed description. It is intended that all such aspects, systems, methods, features, advantages, processes, and objects are to be included within this description, are to be within the scope of the present invention, and are to be protected by the accompanying claims.

Figure 1:
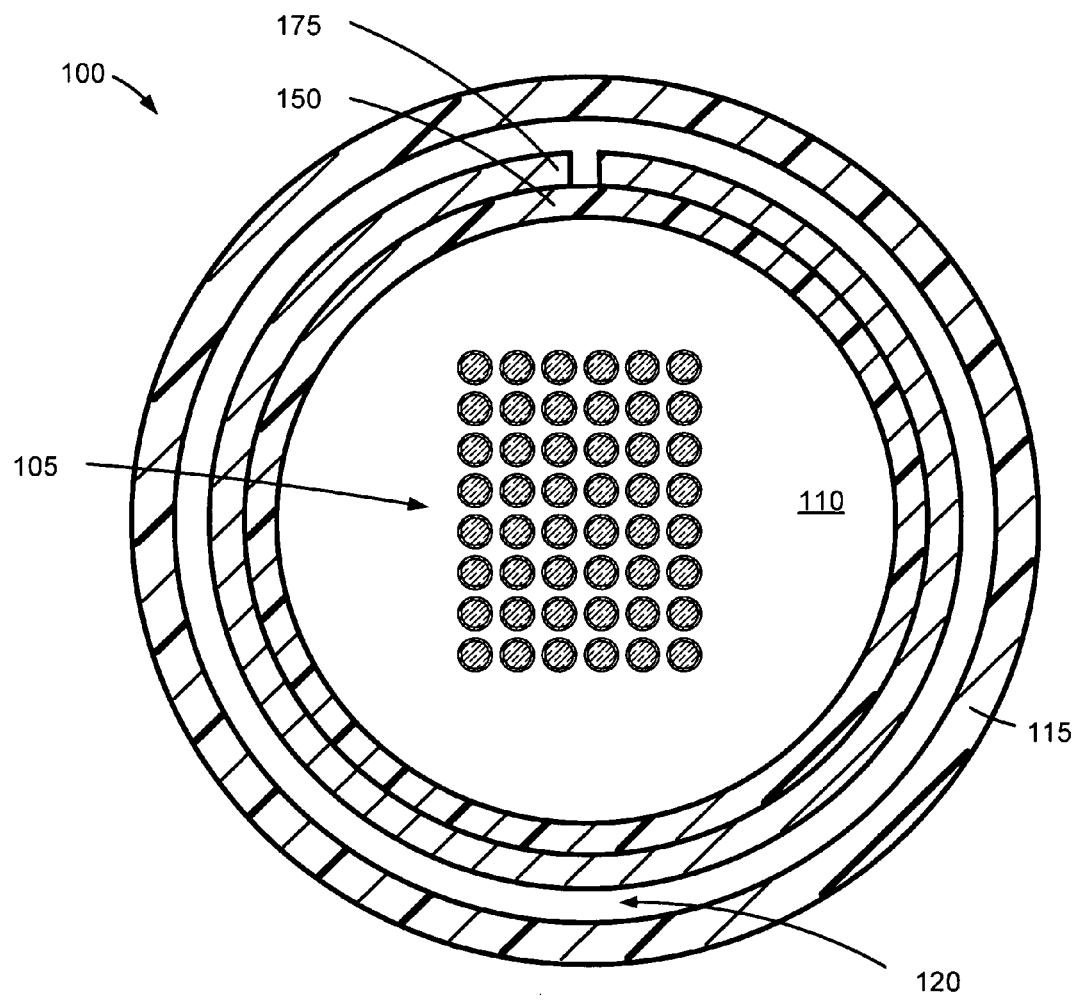
FIG. 1 is a cross sectional view of a fiber optic cable comprising a conductive tape, in accordance with certain exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention supports a cable, such as a fiber optic cable, comprising a conductive tape disposed therein for transmitting a locate signal that can be detected from remote locations, such as when the cable is buried underground. The tape can comprise a low resistance for transmitting the locate signal long distances along the length of the cable. The conductive tape can be circumferentially applied around the core of the cable under the cable's jacket. Thus, the conductive tape can be accessed without exposing the core. The cable can include one or more buffer tubes for housing optical fibers. The buffer tubes and/or the jacket can comprise an antioxidant for preventing degradation associated with contact with copper or other metal of the conductive tape.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to the drawings, in which like reference numerals refer to like (but not necessarily identical) elements, FIG. 1 is a cross sectional view of a fiber optic cable 100 comprising a conductive tape 175, in accordance with certain exemplary embodiments. As discussed below, the conductive tape 175 can transmit a locate signal along the length of the fiber optic cable 100.

Referring to FIG. 1, the fiber optic cable 100 comprises a jacket 115 that extends along the length of the fiber optic cable 100 and provides the cable's outer, cylindrical surface. The jacket 115 can comprise a sheath, a sheathing, a casing, a shell, a skin, or a tube spanning the fiber optic cable 100. Thus, the jacket 115 can run lengthwise along the fiber optic cable 100. The jacket 115 typically comprises a pliable or flexible material, such as a plastic or polymer. For example, the jacket 115 may comprise a fluoropolymer such as FEP, TFE, PTFE, PFA, etc. Alternatively, the jacket 115 can comprise olefin, polyester, silicone, polypropylene, polyethylene, medium density polyethylene, high density polyethylene, polyimide, or some other polymer or other material that provides acceptable strength, fire resistance, or abrasion and chemical properties as may be useful for various applications. Generally, the jacket 115 provides environmental protection as well as strength and structural support.

The fiber optic cable 100 also includes a buffer tube 150 disposed beneath the conductive tape 175 that defines a cable core. In certain exemplary embodiments, an annular gap is present between the buffer tube 150 and the conductive tape 175. Alternatively, the buffer tube 150 and the conductive tape 175 can essentially be flush with one another.

The term "buffer tube," as used herein, generally refers to a tube for containing one or more optical fibers and for providing such optical fibers annular space for lateral movement. When a fiber optic cable is bent, optical fibers in a buffer tube of the cable may move to one side of the buffer tube, for example.

The buffer tube 150 extends along the cable's longitudinal axis and provides a space 110 for optical fibers 105. The space 110 is a three-dimensional or cylindrical volume extending along the fiber optic cable 100. The space 110 can be hollow as illustrated or alternatively can comprise a gelatinous, solid, or foam material, for example. In addition, the space 110 can include protective materials, such as one or more water-swellable tapes and/or one or more water-swellable yarns. In addition or in the alternative, the fiber optic cable 100 may include a water blocking tape or water-swellable tape disposed between the conductive tape 175 and the buffer tube 150. However, other configurations and other water blocking technologies are feasible as would be appreciated by one of ordinary skill in the art having the benefit of the present disclosure.

In the illustrated embodiment, the fiber optic cable 100 contains 48 optical fibers 105 in the buffer tube 150. The optical fibers 105 can form a bundle with ribbons of the optical fibers 105 adhering to one another to form a single unit. A twist in the bundle of optical fibers 105 along the length of the fiber optic cable 100 captures the ribbon stack into a single unit and helps distribute bending stresses among individual optical fibers 105. That is, a stack of ribbons of optical fibers 105 exhibits a lay or a periodic rotation about it central axis. The bundle of optical fibers 105 has freedom of motion within the buffer tube 150, as the inner diameter of the buffer tube 150 can be larger than the diagonal of the bundles' cross section.

In other words, in certain exemplary embodiments, the optical fibers 105 are organized in linear arrays or "ribbons" of optical fibers 105, with the arrays stacked on top of one another. For example, each ribbon may include twelve, twenty four, or more optical fibers 105, with the ribbons stacked to achieve the desired fiber capacity.

The illustrated number of optical fibers 105 and the illustrated configuration are intended to be exemplary rather than limiting. Each optical fiber 105 could be a single mode fiber or some other optical waveguide that carries data optically at 10 or 40 Giga bits per second ("Gbps") or some other appropriate data rate, for example. In various exemplary embodiments, the optical fibers 105 can be single mode, or multimode and can have a composition based on glass, glassy, or silica material. Alternatively, the optical fibers 105 can incorporate plastic material as an optical transmission medium.

The conductive tape 175 of the fiber optic cable 100 is disposed inside the jacket 115 surrounding the buffer tube 150. As illustrated, the conductive tape 175 extends longitudinally along the length of the fiber optic cable 100, essentially running parallel with and wrapping over the optical fibers 105. In various exemplary embodiments, the conductive tape 175 can circumferentially cover, house, encase, or enclose one or more optical fibers 105 (or other signal conductors) and/or the buffer tube 150. Thus, the conductive tape 175 can circumscribe the buffer tube 150, to extend around or over the optical fibers 105. Although FIG. 1 depicts the conductive tape 175 as partially circumscribing the buffer tube 150, that illustrated geometry is merely one example. In many situations, the conductive tape 175 will overlap itself to fully circumscribe the optical fibers 105. Moreover, in certain exemplary embodiments, the side edges of the conductive tape 175 can essentially butt up to one another around the buffer tube 150 of the fiber optic cable 100. Further, in certain exemplary embodiments, a significant gap can separate these edges, so that the conductive tape 175 does not fully circumscribe the buffer tube 150. In an alternative embodiment to that illustrated, the conductive tape 175 can wind helically or spirally around the buffer tube 150.

In certain exemplary embodiments, the conductive tape 175 has a width that is significantly less than the circumference of the buffer tube 150 (or of the entire fiber optic cable 100). Thus, the conductive tape 175 can be disposed in various locations within the fiber optic cable 100, including in the buffer tube 150 or between two layers of jacketing material or in some other location within the fiber optic cable 100. However, disposing the conductive tape 175 just inside the jacket 115 and outside of the buffer tube 150 allows for the conductive tape 175 to be accessed without exposing the optical fibers 105 in the buffer tube 150.

In certain exemplary embodiments, the fiber optic cable 100 may include a small annular space 120 between the jacket 115 and the conductive tape 175. Alternatively, the conductive tape 175 can adhere to or otherwise contact the jacket 115, for example as a result of a fabrication process that extrudes the jacket 115 over the conductive tape 175.

Exemplary embodiments of the fiber optic cable 100 also can comprise various other elements appropriate for use in fiber optic cables. For example, the fiber optic cable 100 can include strength members (not shown), such as slender fiberglass rods, aramid cords, or metallic rods, disposed between the jacket 115 and the conductive tape 175. For example, two radial strength members can be located under the jacket 115 to enhance structural support.

In certain exemplary embodiments, the fiber optic cable 100 includes an aramid material or some other form of strength member disposed between the buffer tube 150 and the conductive tape 175. One or more "rip cords" (not shown) also may be disposed between the buffer tube 150 and the conductive tape 175 to facilitate opening the conductive tape 175 in connection with terminating the fiber optic cable 100, or performing some related service. One or more rip cords (not shown) also may be disposed between the jacket 115 and the conductive tape 175 to facilitate separating the jacket 115 from the conductive tape 175 via pulling the rip cords. In other words, rip cords help open the fiber optic cable 100 for installation or field service.

In certain exemplary embodiments, the conductive tape 175 can comprise a flat, smooth surface on one or both sides of the conductive tape 175. In addition or in the alternative, one or both sides of the conductive tape 175 may be corrugated.

Figure 4:
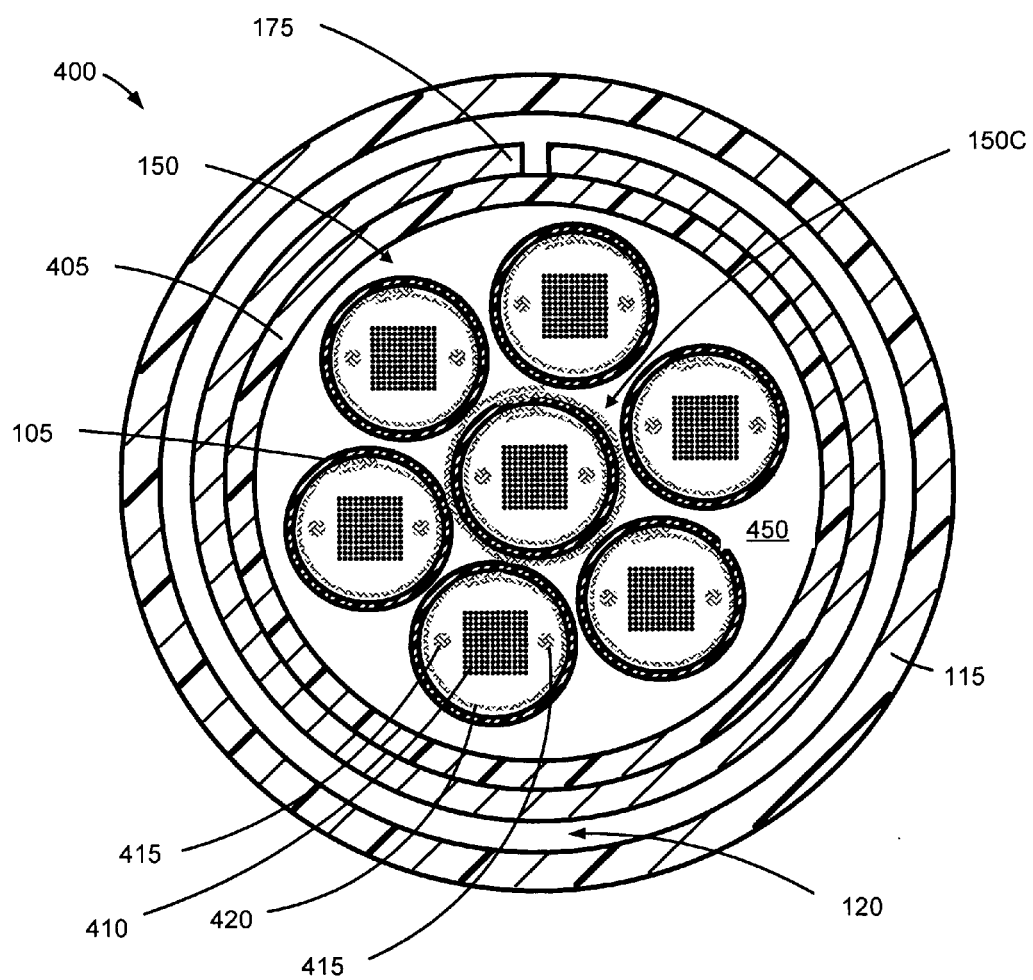
FIG. 4 is a cross sectional view of a fiber optic cable comprising a conductive tape, in accordance with certain exemplary embodiments.

The fiber optic cable 100 can comprise other types of fiber optic core configurations. For example, FIG. 4 is a cross sectional view of a fiber optic cable 400 comprising a conductive tape 175, in accordance with certain exemplary embodiments. Referring to FIG. 4, the fiber optic cable 400 includes a core 450 comprising a ring of buffer tubes 150 disposed about a central buffer tube 150C. More specifically, the illustrated fiber optic cable 400 comprises a six-around-one configuration whereby six buffer tubes 150 are disposed generally about or can be stranded around a seventh buffer tube 150C. In certain exemplary embodiments, the buffer tubes 150, 150C are substantially identical to one another or manufactured to a common specification.

In certain other exemplary embodiments, a ring of buffer tubes 150 may be disposed around a central strength member (not shown). That is, the central buffer tube 150C may be replaced by a central strength member in certain exemplary embodiments.

In the illustrated embodiment, each buffer tube 150, 150C carries or encloses a stack of fiber optic ribbons 410, two water-swellable yarns 415, and a water-swellable tape 420. In other embodiments, each buffer tube 150, 150C may carry or enclose single or loose optical fibers. In the illustrated embodiment, the water-swellable tape 420 contacts or adjoins the inner surface of the associated buffer tube 150, 150C, the water-swellable yarn 415, and the stack of fiber optic ribbons 410. Further, the stack of fiber optic ribbons 410 contacts or adjoins the water-swellable yarn 415.

The conductive tape 175 of the exemplary fiber optic cable 400 is disposed between a jacket 115 and a water blocking tape 405. The conductive tape 175 can fully or partially circumscribe the core 450 in a manner similar to the manner that the conductive tape circumscribes the buffer tube 150 if the fiber optic cable 100 illustrated in FIG. 1 and described above.

Referring back to FIG. 1, the conductive tape 175 can be used to transmit a locate signal along the length of the fiber optic cable 100 to facilitate locating the fiber optic cable 100 from a remote location. For example, the fiber optic cable 100 may be buried underground or installed behind a wall or in another remote location that is inaccessible or difficult to access. One end of the conductive tape 175 may be coupled to a signal transmitter (see FIG. 2) to receive the locate signal from the signal transmitter.

In certain exemplary embodiments, the locate signal may be a Radio Frequency ("RF") signal. For example, an RF transmitter may inject an RF locate signal onto the conductive tape 175 and the conductive tape 175 in turn may radiate RF energy along the length of the fiber optic cable 100. A technician or other person can then search for and locate the fiber optic cable 100 using an RF detector to detect the RF energy radiated from the conductive tape 175. In certain exemplary embodiments, the locate signal may comprise a frequency between approximately 5 Hz and 200 kHz.

Utility companies commonly install fiber optic cables 100 over great distances. For example, telecommunications companies often employ networks of fiber optic cables 100 to cover a metropolitan area or to extend from one metropolitan area to another, wherein many of the fiber optic cables 100 span 40-50 miles or more. To carry a locate signal these distances, the conductive tape 175 may have a resistance, of about ten ohms per mile or less. Excessively large resistances can degrade the strength and quality of the locate signal over larger distances resulting in the locate signal being undetectable from a remote location.

Towards meeting such a resistance objective, the exemplary conductive tape 175 is configured to have a resistance less than ten ohms per mile and in certain exemplary embodiments, the conductive tape 175 has a resistance of approximately six ohms per mile. Several factors affect the amount of electrical resistance for a given conductor, such as the resistivity of the material used to make the conductor, the geometry of the conductor, and temperature. For example, materials such as copper and aluminum have lower resistivities and therefore lower resistances than many other materials. Also, increasing the size of the cross-sectional area (across the direction of signal propagation) can decrease the amount of resistance for a conductor. Further, the resistivity of a given material increases with an increase in temperature. For example, Equation 1 below can be used to calculate the resistivity of a material at a given temperature using an initial resistivity of the material at a temperature of 20° C.

$$\rho_f = \rho_o + \alpha \cdot \Delta T \cdot \rho_o \qquad \text{Equation 1}$$

In Equation 1, the symbol $\rho_f$ is the resistivity (ohm meters) of a material at a given temperature; the symbol $p_o$ is the initial resistivity (ohm meters) of the material at a temperature of 20° C.; the symbol $\alpha$ is the temperature coefficient (° C.$^{-1}$) for the material; and $\Delta T$ is the difference (° C.) between the given temperature and the temperature at which the initial resistivity for the material is provided.

Fiber optic cables 100 are often deployed in environments having relatively high temperatures that may even approach 70° C. In addition, many fiber optic cables 100 that are buried underground surface at one or more locations and can therefore be exposed to high temperatures. Thus, it is desirable to provide a conductive tape 175 that can maintain a low resistance (e.g., less than ten ohms per mile) at temperatures up to or above approximately 70° C.

Equation 2 below can be used to calculate the resistance of a conductive tape 175 at a temperature of 70° C.

$$R_{70} = \frac{\rho_f \cdot l}{A} \quad \text{Equation 2}$$

In Equation 1, $R_{70}$ is the resistance (ohms) of the conductive tape 175 at a temperature of 70° C. having a length 1 (meters ("m")), a cross-sectional area A (m$^2$), and comprising a resistivity of $\rho_f$ at a temperature of 70° C.

In one exemplary embodiment, a corrugated conductive tape 175 meeting the aforementioned desirable parameters comprises a rectangular shaped tape comprising or consisting of copper. This exemplary conductive tape 175 has a tape width of $1.524 \times 10^{-2}$ meters ("m") and a tape thickness of $1.524 \times 10^{-4}$ m, giving the conductive tape 175 a cross-sectional area of $6.29 \times 10^{-6}$ m. The exemplary conductive tape 175 comprises $4.0724 \times 10^2$ corrugations per meter with each corrugation having a height of approximately $7 \times 10^{-4}$ m. This corrugated tape comprises a total length of 1929.51 m for one mile (~1690 m) of fiber optic cable 100. Plugging this length, cross-sectional area, and a resistivity of $1.72 \times 10^{-8}$ ohm meters at 20° C. for copper into Equations 1 and 2 results in a resistance of 6.31 ohms per mile of fiber optic cable 100 at 70° C.

Although the aforementioned exemplary conductive tape 175 comprises copper, other materials, such as aluminum, are feasible as long as the configuration of the conductive tape 175 meets the resistance objectives for a locate signal transmission. As other materials may have a higher resistivity than copper, fewer corrugations may be utilized to reduce the resistance of the tape. Also a larger cross sectional area may be used to reduce the resistance. However, an increase in cross-sectional area also may undesirably increase the diameter of the fiber optic cable.

In certain exemplary embodiments, the buffer tube 150 (and 150C) can comprise an antioxidant to prevent degradation to the buffer tube 150 caused by the conductive tape 175. For example, copper and copper alloys can degenerate some polyethylene compositions over time. In certain exemplary embodiments, an antioxidant can be applied as a coating to a polyethylene buffer tube 150. For example, the antioxidant coating may be applied to an exterior surface of the buffer tube 150 adjacent to the conductive tape 175. In addition or in the alternative, an antioxidant may be impregnated into a polyethylene buffer tube 150. In certain exemplary embodiments, the buffer tube 150 may comprise a phenolic, such as CIBA IRGANOX 1010.

In certain exemplary embodiments, the jacket 115 comprises an antioxidant to prevent degradation to the jacket 115 caused by the conductive tape 175. For example, the antioxidant may be applied as a coating to an interior surface of the polyethylene jacket 115 adjacent to the conductive tape 175. In addition or in the alternative, the antioxidant may be impregnated into a polyethylene jacket 115. In certain exemplary embodiments, the jacket 115 may comprise a phenolic, such as CIBA IRGANOX 1010.

Although the discussion of the conductive tape 175 has been described in terms of a fiber optic cable 100, the conductive tape 175 may be employed in other types of cables carrying other types of signal conductors. For example, the conductive tape 175 may be included in a cable carrying insulated wires, twisted pairs, or any other type of signal conductor to facilitate locating the cable in remote locations.

Figure 2:
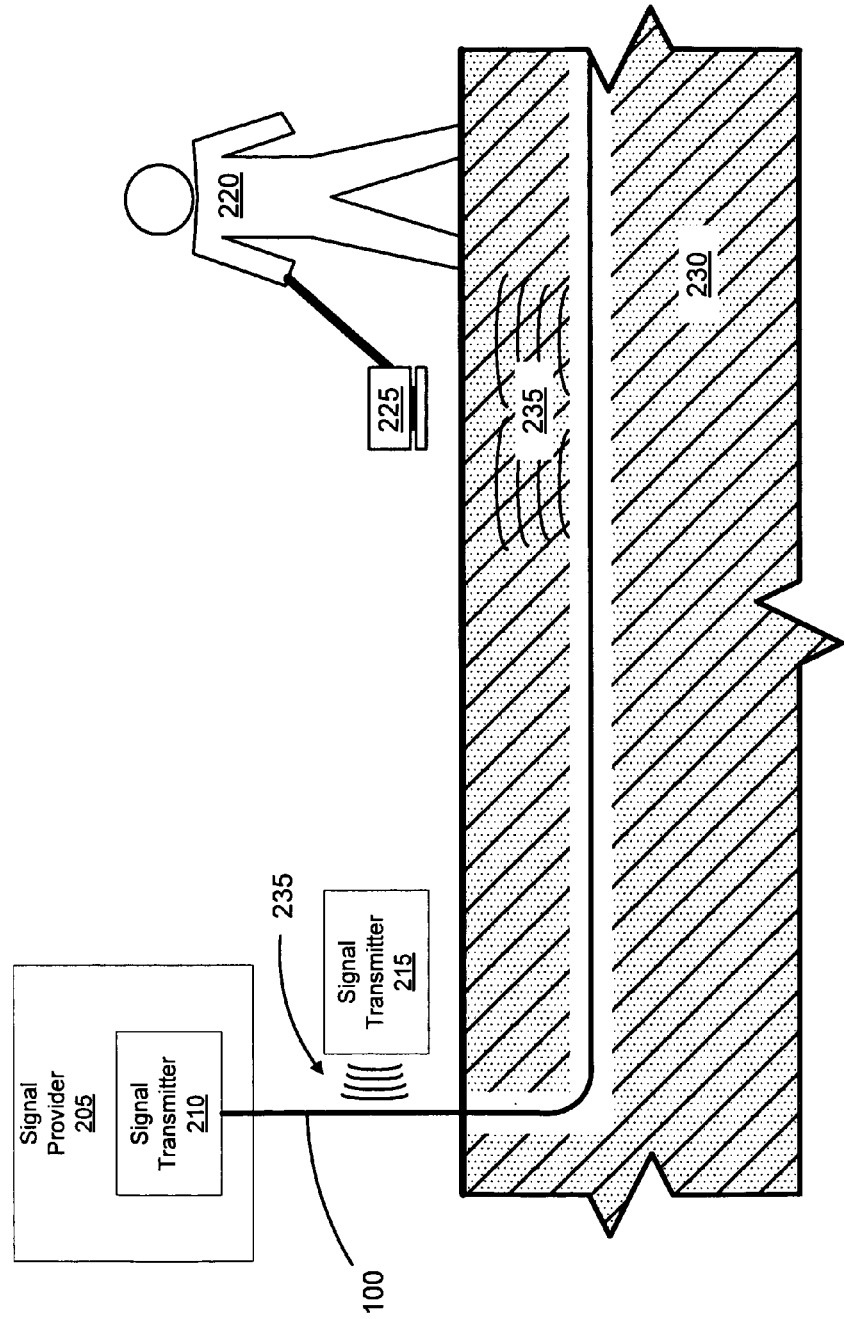
FIG. 2 is an illustration depicting a scenario for detecting a fiber optic cable buried under ground, in accordance with certain exemplary embodiments.
Figure 3:
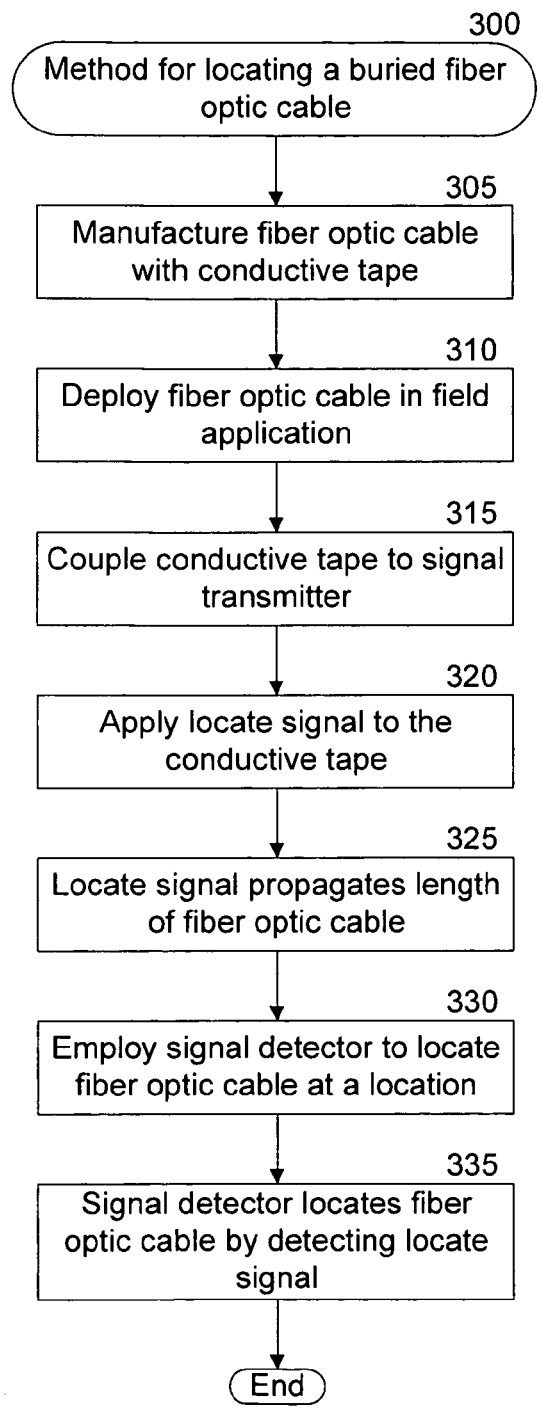
FIG. 3 is a flow chart depicting a process for locating a fiber optic cable buried under ground, in accordance with certain exemplary embodiments.

Turning now to FIGS. 2 and 3, FIG. 2 depicts a scenario for detecting a fiber optic cable 100 buried under ground 230, in accordance with certain exemplary embodiments. FIG. 3 is a flow chart depicting a process 300 for locating a fiber optic cable 100 buried under ground 230, in accordance with certain exemplary embodiments. Certain steps in the processes or process flows described in the logic flow diagram referred to below must naturally precede others for the invention to function as described. However, the invention is not limited to the order of the steps described if such order or sequence does not alter the functionality of the invention. That is, it is recognized that some steps may be performed before, after, or in parallel with other steps without departing from the scope or spirit of the invention. The process 300 is described below with reference to FIGS. 2 and 3.

In step 305 of process 300, the fiber optic cable 100 is manufactured with a conductive tape 175. In step 310, the fiber optic cable 100 is deployed in a field application. In this exemplary embodiment, deploying the fiber optic cable 100 includes burying the fiber optic cable 100. In addition or in the alternative, deploying the fiber optic cable 100 may include running the fiber optic cable 100 through a conduit underground or within walls, floors, or ceilings; placing the fiber optic cable 100 into a cable tray; and/or placing the fiber optic cable 100 within a riser or plenum environment. In any of these cases, the fiber optic cable 100 may be part of a structured cable or may be bundled along with other cables or along pipes or conduits.

In step 315, the conductive tape 175 of the fiber optic cable 100 is coupled to a signal transmitter 210 of a signal provider 205. The signal provider 205 may be an entity that operates or otherwise manages the fiber optic cable 100. For example, the signal provider 205 may be a utility company, such as a telecommunications company, that operates and manages a large network of fiber optic cables. The signal transmitter 210 can transmit a locate signal 235 along the conductive tape 175 and the conductive tape 175 can in turn radiate electromagnetic energy that can be detected by a signal detector 225 from above ground. As illustrated, the signal detector 225 is operated by a technician 220. The signal transmitter 210 may be located at a central hub to provide locate signals to multiple fiber optic cables 100. For example, the conductive tape 175 may be terminated at a signal transmitter 210 that resides in a facility at which the fiber optic cable 100 is terminated.

In step 320, the signal transmitter 210 applies the locate signal 235 to the conductive tape 175 of the fiber optic cable 100. For example, an operator or technician may activate the signal transmitter 210 and close a switch that couples the locate signal 235 to the conductive tape 175. Alternatively, the locate signal 235 may be continuously applied to the conductive tape 175.

In certain exemplary embodiments, the signal transmitter 210 can transmit locate signals 235 having a frequency between approximately 5 Hz and 200 kHz. In certain exemplary embodiments, the signal transmitter 210 may transmit multiple signals onto the conductive tape 175. For example, the signal transmitter 210 may transmit a first RF locating signal for generally locating this signal with a signal detector 225 and a second near-DC signal for confirming the location of the fiber optic cable 100. One of ordinary skill in the art having the benefit of the present disclosure would appreciate that many other combinations of signals are feasible.

In certain exemplary embodiments, the locate signal 235 may be induced onto the conductive tape 175 using a portable signal transmitter (not shown). The portable signal transmitter allows a technician, such as technician 220, to apply a locate signal 235 from a field location rather than a location that the fiber optic cable 100 is terminated. For example, the technician 220 may locate the fiber optic cable 100 in an above ground 230 location (e.g., pedestal or above ground cabinet) and use the portable signal transmitter to induce the locate signal 235 onto the conductive tape 175. In certain exemplary embodiments, the portable signal transmitter transmits locate signals 235 having a frequency between approximately 50 Hz and 200 kHz. In certain exemplary embodiments, the portable signal transmitter transmits signals having a power level between approximately one watt and ten watts. In certain exemplary embodiments, the portable signal transmitter may induce multiple signals onto the conductive tape 175, similar to the signal transmitter 210 described above.

In step 325, the locate signal 235 propagates the length of the conductive tape 175. As described above in connection with FIG. 1, the conductive tape 175 can comprise a low resistance (e.g., less than 10 ohms per mile) that helps the locate signal 235 travel large distances along the conductive tape 175.

In step 330, the technician 220 scans the area with the signal detector 225 to locate the fiber optic cable 100. The signal detector 225 can sense or otherwise detect the locate signal 235 that is radiated by the conductive tape 175 that makes its way above ground 230. For example, the locate signal 235 may comprise an RF signal and the signal detector 225 may comprise an RF detector. In step 335, the signal detector 225 detects the locate signal 235 and thereby locates the cable 100.

One of ordinary skill in the art would appreciate that the present invention supports a communication cable, such as a fiber optic cable, comprising a conductive tape that extends along the cable and facilitates locating the cable from a remote location, for example when the cable is buried under ground. The tape can comprise a low resistance for transmitting a locate signal along the length of the cable that can be detected remotely by a detector without exposing the cable. The conductive tape can be circumferentially applied around the core of the cable under the cable's jacket. Thus, the conductive tape can be accessed without necessarily exposing the core. The cable can include one or more buffer tubes for housing optical fibers. The buffer tubes and/or the jacket can comprise an antioxidant for preventing degradation associated with contact with copper or other metal of the conductive tape.

The exemplary processes and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A fiber optic cable comprising:
   a buffer tube comprising one or more optical fibers;
   a single layer conductive tape wrapped at least partially around the buffer tube and extending along a length of the fiber optic cable, the conductive tape having a resistance less than about ten ohms per mile and configured to transmit an electrical signal along the length of the fiber optic cable; and
   a jacket circumferentially covering the conductive tape.

2. The fiber optic cable of claim 1, wherein the resistance of the conductive tape is less than seven ohms per mile.

3. The fiber optic cable of claim 1, wherein the conductive tape comprises at least one of a flat surface and a corrugated surface.

4. The fiber optic cable of claim 1, wherein the conductive tape comprises copper and wherein the buffer tube comprises polyethylene and an antioxidant for hindering the copper from degrading the polyethylene.

5. The fiber optic cable of claim 1, wherein the antioxidant comprises a phenolic.

6. The fiber optic cable of claim 1, wherein the conductive tape circumferentially covers the buffer tube.

7. The fiber optic cable of claim 1, wherein the conductive tape partially circumscribes the buffer tube.

8. The fiber optic cable of claim 1, wherein the buffer tube comprises an antioxidant operative to suppress degradation from contact with a metallic material of the conductive tape.

9. The fiber optic cable of claim 1, wherein the conductive tape comprises copper and the buffer tube comprises an antioxidant that suppresses chemical interaction between the copper and the buffer tube.

10. A method for locating a fiber optic cable buried under ground, comprising:
    coupling an electrical locate signal onto a single layer conductive tape disposed in the fiber optic cable, the conductive tape having a resistance less than about 10 ohms per mile and configured to carry the locate signal along the length of the fiber optic cable; and
    detecting energy radiating from the conductive tape above the ground with a signal detector.

11. The method of claim 10, wherein the locate signal comprises a Radio Frequency ("RF") signal and the signal detector comprises an RF detector.

12. The method of claim 10, wherein the resistance of the conductive tape is less than seven ohms per mile.

13. The method of claim 10, wherein the conductive tape comprises at least one of a flat surface and a corrugated surface.

14. The method of claim 10, wherein the conductive tape comprises copper or a copper alloy.

15. The method of claim 14, wherein the fiber optic cable comprises at least one optical fiber disposed in a buffer tube comprising polyethylene and an antioxidant for suppressing degradation of the polyethylene due to contact with the copper.

16. The method of claim 10, wherein the locate signal is inductively coupled onto the conductive tape.

17. The method of claim 10, wherein the conductive tape is connected to a signal transmitter to receive the locate signal.

18. A fiber optic cable comprising:
 a jacket extending lengthwise and defining an internal volume;
 a plurality of buffer tubes stranded and extending lengthwise in the internal volume, each circumferentially surrounding a respective stack of optical fibers; and
 an electrically conductive tape, extending lengthwise within the internal volume, and having a resistance not greater than about 10 ohms per mile,
 wherein at least one of the buffer tubes comprises a polymer and an antioxidant that is operative to avert degradation of the polymer due to contact with the electrically conductive tape.

19. The fiber optic cable of claim 18, wherein the antioxidant comprises a phenolic and the electrically conductive tape comprises a single layer of copper.

20. The fiber optic cable of claim 18, further comprising a water-swellable tape extending lengthwise within the internal volume.

21. The fiber optic cable of claim 18, wherein the jacket comprises a polymer and an antioxidant that is operative to avert degradation of the polymer die to contact with the electrically conductive tape.

* * * * *